United States Patent [19]

Oka et al.

[11] Patent Number: 5,723,571
[45] Date of Patent: Mar. 3, 1998

[54] POLYIMIDE AND PROCESS FOR PRODUCING THE SAME

[75] Inventors: Osamu Oka; Takeshi Nishigaya, both of Shizuoka, Japan

[73] Assignee: Tomoegawa Paper Co., Ltd., Tokyo, Japan

[21] Appl. No.: 703,151

[22] Filed: Aug. 29, 1996

[30] Foreign Application Priority Data

Aug. 31, 1995 [JP] Japan .................. 7-245148

[51] Int. Cl.$^6$ .................. C08G 73/10; C08G 69/26
[52] U.S. Cl. .................. 528/353; 528/26; 528/33; 528/38; 528/125; 528/128; 528/170; 528/171; 528/172; 528/173; 528/174; 528/179; 528/183; 528/185; 528/188; 528/220; 528/229; 528/350
[58] Field of Search .................. 528/353, 125, 528/26, 33, 38, 128, 170, 171, 172, 173, 174, 179, 183, 185, 188, 220, 229, 350

[56] References Cited

U.S. PATENT DOCUMENTS

| | | | |
|---|---|---|---|
| 4,520,075 | 5/1985 | Igarashi et al. | 528/125 |
| 4,851,505 | 7/1989 | Hayes | 528/353 |
| 5,300,627 | 4/1994 | Kunimune et al. | 528/353 |
| 5,320,886 | 6/1994 | Bowen | 528/185 |

FOREIGN PATENT DOCUMENTS

| | | |
|---|---|---|
| 43-5911 | 4/1968 | Japan . |
| 43-18914 | 8/1968 | Japan . |
| 60-258225 | 12/1985 | Japan . |
| 64-22963 | 1/1989 | Japan . |
| 1-263116 | 10/1989 | Japan . |
| 1-263117 | 10/1989 | Japan . |
| 2-11633 | 1/1990 | Japan . |
| 5-78481 | 3/1993 | Japan . |

*Primary Examiner*—P. Hampton-Hightower
*Attorney, Agent, or Firm*—Lowe, Price, LeBlanc & Becker

[57] ABSTRACT

A novel polyimide is soluble in organic solvents and excels in heat resistance. The polyimide comprises 95–40 mol % of the repeating unit represented by the formulas (1) and 60–5 mol % of the repeating unit represented by the formula (2) and has a number average molecular weight of 4,000–200,000:

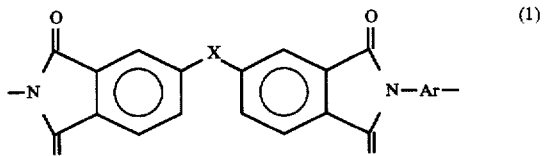

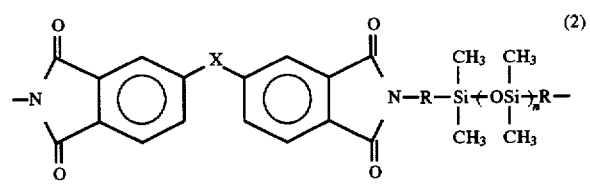

wherein X is —SO$_2$— and/or —C(=O)—OCH$_2$CH$_2$O—C(=O)—, Ar is a divalent group containing aromatic rings, and R is an alkylene group having 1–10 carbon atoms or a group: —CH$_2$OC$_6$H$_4$—, and n is an integer of 1–20.

10 Claims, No Drawings

POLYIMIDE AND PROCESS FOR PRODUCING THE SAME

BACKGROUND OF THE INVENTION

1) Field of the Invention

This invention relates to a novel polyimide which is soluble in organic solvents and excels in heat resistance, and to a process for producing the same.

2) Related Art

Generally, polyimide resins excel in heat resistance, but many of them have poor processing abilities due to their insolubility and infusibility. For this reason, in order to form a polyimide into a film, etc., a process for obtaining a polyimide mold by using a varnish with a polyamic acid, which is a precursor of the polyimides, dissolved in an organic solvent for molding and processing, and carrying out imidation through a dehydration ring closure reaction.

However, since the polyamic acid varnish easily undergoes hydrolysis and amide interchange reaction, it is necessary for preventing the polyamic acid varnish from being changed into a low molecular weight form and from gelation to store it at a low temperature. Furthermore, since the solvent used easily absorbs moisture, there is a problem that the moistened resin is separated from the varnish. Moreover, there is also a problem that after the formation of the film, etc., the condensed water formed during the imidation reaction forms voids in the products. In addition, since a high temperature of not less than 300° C. is required for carrying out the imidation reaction, it is very difficult to provide a polyimide coating layer on a base having no heat resistance.

Consequently, in order to solve the problems associated with the polyimide, studies and developments have been made to obtain polyimides capable of forming and processing by selecting a raw material having solubility in an organic solvent or having a softening point, and many suggestions have been made. For example, Japanese Patent Laid-Open 10051/1987 discloses a polyimide obtainable from a diamine represented by the following formula (6) and pyromellitic acid. However, this polyimide has a softening point of not less than 300° C. and has formability and processability, but since it is bad soluble in organic solvents, a varnish of polyamic acid, which is a precursor, must be used for forming a film, etc. The problems described above have yet been left.

carboxylic dianhydride such as biphenyltetracarboxylic dianhydride or pyromellitic dianhydride. These polyimides are soluble in N-methyl-2-pyrrolidone and m-cresol, and have a glass transition point of not less than 400° C. However, these solvents which have high boiling points are not suitable for forming films, etc.

Japanese Patent Publication 18914/1968 discloses a polyimide obtainable from p-phenylenebis(trimellitate) dianhydride and a diamine such as benzidine, 4,4'-diaminodiphenyl ether, etc., and Japanese Patent Publication 5911/1968 discloses that bisphenol A bistrimellitate dianhydride may be used as raw materials for a polyimide. However, the polyimides obtainable by these processes have not yet been reported to be dissolved in a low polar solvent.

Japanese patent Laid-Open 258225/1985 discloses a polyimide obtainable from 1,4-bis(p-aminocumyl)benzene and an aromatic acid dianhydride or aliphatic acid dianhydride. The polyimide has a merit of being soluble in N-methyl-2-pyrrolidone, but it is insoluble in a low polar solvent and a low boiling-point solvent and has demerits that its the glass transition point is lower than 200° C. and its heat resistance is low as for the mechanical strength. Japanese patent Laid-Open 11633/1990 discloses a process for producing a polyimide from a diamine as represented by the above formula (6) and bisphenol A bistrimellitate dianhydride. The polyimide is not only soluble in N-methyl-2-pyrrolidone but also in N,N-dimethylformamide, dioxane, etc., but is insoluble in diethylene glycol dimethyl ether. Furthermore, the diamine described above is difficult to be produced, which indicate the difficulty of industrially carrying out this process for producing the polyimide.

Japanese Patent Laid-Open 78481/1993 discloses a polyimide obtained from a diamine represented by the above formula (6) and bisphenol A bistrimellitate dianhydride or a dianhydride represented by the following formula (7). The polyimide is not only soluble in N-methyl-2-pyrrolidone and N,N-dimethylformamide, but also in dioxane, tetrahydrofuran, diethylene glycol dimethyl ether, toluene, etc. However, since the acid dianhydride which is the raw material is difficult to be produced in high purity, the process is proven to be inadequate for industrial production. It also discloses that no polyimide having sufficient flexibility is obtainable from only 2,2', 5,5'-tetraisopropyldiphenylmethane and bisphenol A bistrimellitate dianhydride.

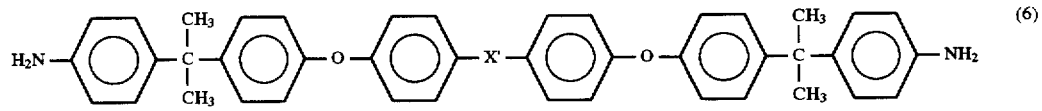
(6)

wherein X' is —SO$_2$— or —C(=O)—.

Japanese Patent Laid-Open 263116/1988 and Japanese Patent Laid-Open 263117/1988 disclose polyimides obtainable from 4,4'-methylenebis(2,6-dialkylaniline) and a tetra-

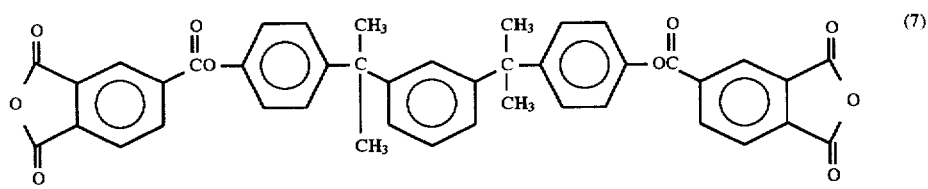
(7)

Japanese Patent Laid-Open 22963/1989 discloses polyimides having solubility obtained from diphenylsulfone-3,3',4,4'-tetracarboxylic acid andihydride and various aromatic diamines. However, these polyimides have problems that they have a relatively high softening point and are soluble in only amide solvents or phenol solvents, and that the viscosity becomes high even in a low concentration, by which they are poor in processability.

Moreover, there are many reports concerning polyimides having a siloxane skeleton, but no polyimide having sufficiently satisfied solubility and heat resistance is obtainable till now.

In light of such situations, the present invention has been done to make an improvement. An object of the present invention is, therefore, to provide a novel polyimide which is soluble in various organic solvents and which excels in processability and heat resistance and a process for producing the same.

SUMMARY OF THE INVENTION

The polyimide of the present invention comprises at least one of repeating units represented by the following formulas (1a) and (1b) and at least one of repeating units represented by the following formulas (2a) and (2b) and has a number average molecular weight of from 4,000 to 200,000.

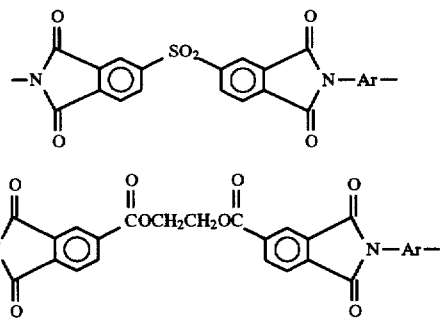

wherein Ar is a divalent aromatic groups selected from the following formulas:

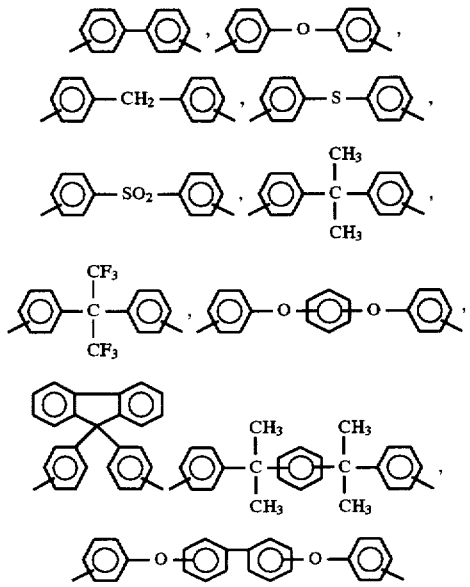

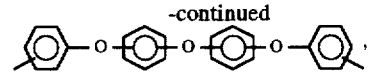
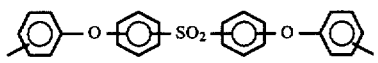
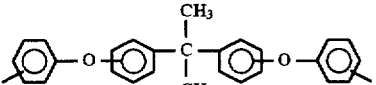
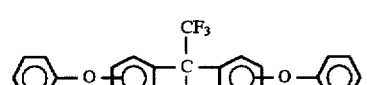
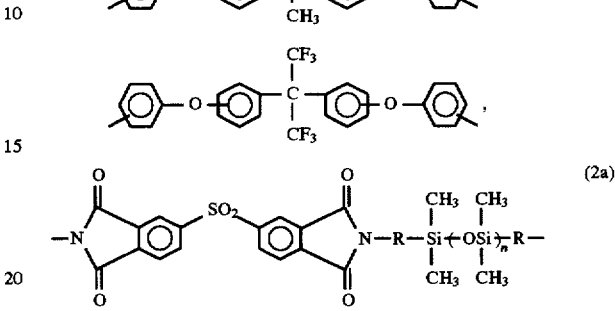
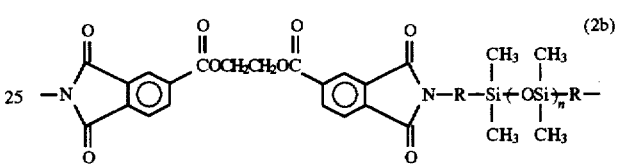

wherein R represents an alkylene group having 1–10 carbon atoms or the group: —CH$_2$OC$_6$H$_4$—, and n is an Integer of 1–20.

The polyimide of the present invention is produced by reacting at least one compound selected from tetracarboxylic dianhydrides represented by the following formulas (3a) and (3b) with a compound represented by the following formula (4) and siloxane compounds represented by the following formula (5).

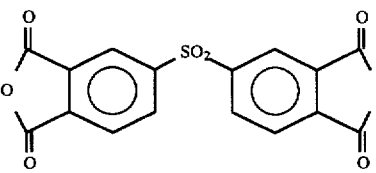

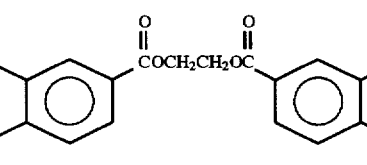

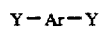

wherein Ar has the same meaning as described above, and Y represents an amino group or an isocyanate group,

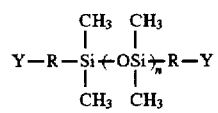

wherein R represents an alkylene group having 1–10 carbon atoms or the group: —CH$_2$OC$_6$H$_4$— where —CH$_2$— attaches to Si atom, Y is an amino group or an isocyanate group, and n is an integer of 1–20.

DETAILED DESCRIPTION OF PREFERRED EMBODIMENTS

The embodiments of the present invention will now be described in detail.

The polyimide of the present invention preferably contains from 95 to 40 mol % of at least one of the repeating units represented by the following formulas (1a) and (1b). In this case, the polyimide containing "at least one of the repeating units represented by the formulas (1a) and (1b)" includes that containing the repeating unit represented by the formula (1a) alone, that containing the repeating unit represented by the formula (1b) alone, and that containing both the repeating units represented by the formulas (1a) and (1b).

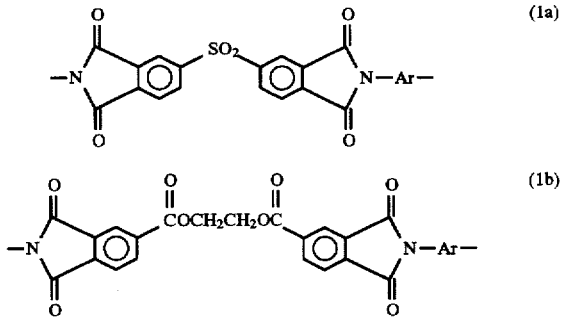

wherein Ar is the same meaning as described above.

The polyimide of the present invention preferably contains from 5 to 60 mol % of at least one of the repeating units represented by the following formulas (2a) and (2b). In this case, the polyimide containing "at least one of the repeating units represented by the formulas (2a) and (2b)" includes that containing the repeating unit represented by the formula (2a) alone, that containing the repeating unit represented by the formula (2b) alone, and that containing both the repeating units represented by the formulas (2a) and (2b).

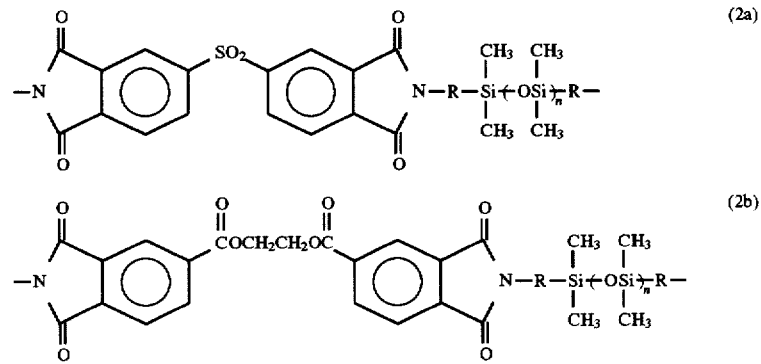

wherein R and n are each the same meaning as described above.

A preferred polyimide of the present invention comprises from 95 to 40 mol % of at least one of the repeating units represented by the above formulas (1a) and (1b) and from 5 to 60 mol % of at least one of the repeating units represented by the above formulas (2a) and (2b), which has a number average molecular weight of from 4,000 to 200,000.

In the polyimide of the present invention, examples of tetracarboxylic dianhyrides represented by the formulas (3a) and (3b) which are used as raw materials for producing the polyimide are 3,3',4,4'-diphenylsulfonetetracarboxylic dianhydride and ethylene glycol bistrimellitate dianhydride, respectively.

Examples of the compound represented by the formula (4) include those wherein Ar is a divalent group selected from the above mentioned formulas having aromatic rings. Typical examples of the compound wherein the functional group Y is an amino group include the following diamines: 3,3'-diaminobiphenyl, 3,4'-diaminobiphenyl, 4,4'-diaminobiphenyl, 3,3'-diaminodiphenylmethane, 3,4'-diaminodiphenylmethane, 4,4'-diaminodiphenylmethane, 2,2-(3,3'-diaminodiphenyl)propane, 2,2-(3,4'-diaminodiphenyl)-propane, 2,2-(4,4'-diaminodiphenyl) propane, 2,2-(3,3'-diaminodiphenyl) hexafluoropropane, 2,2-(3,4'-diaminodiphenyl) hexafluoropropane, 2,2-(4,4'-diaminodiphenyl) hexafluoropropane, 3,3'-oxydianiline, 3,4'-oxydianiline, 4,4'-oxydianiline, 3,3'-diaminodiphenyl sulfide, 3,4'-diaminodiphenyl sulfide, 4,4'-diaminodiphenyl sulfide, 3,3'-diaminodiphenyl sulfone, 3,4'-diaminodiphenyl sulfone, 4,4'-diaminodiphenyl sulfone, 1,3-bis[1-(3-aminophenyl)-1-methylethyl]benzene, 1,3-bis[1-(4-aminophenyl)-1-methylethyl]benzene, 1,4-bis[1-(3-aminophenyl)-1-methylethyl]benzene, 1,4-bis[1-(4-aminophenyl)-1-methylethyl]benzene, 1,3-bis(3-aminophenoxy)benzene, 1,3-bis(4-aminophenoxy)-benzene, 1,4-bis(3-aminophenoxy)benzene, 1,4-bis(4-aminophenoxy) benzene, 3,3'-bis(3-aminophenoxy) diphenyl ether, 3,3'-bis(4-aminophenoxy)diphenyl ether, 3,4'-bis(3-aminophenoxy)diphenyl ether, 3,4'-bis(4-aminophenoxy)diphenyl ether, 4,4'-bis(3-aminophenoxy) diphenyl ether, 4,4'-bis(4-aminophenoxy)diphenyl ether, 3,3'-bis(3-aminophenoxy)biphenyl, 3,3'-bis(4-aminophenoxy)biphenyl, 3,4'-bis(3-aminophenoxy) biphenyl, 3,4'-bis(4-aminophenoxy)biphenyl, 4,4'-bis(3-aminophenoxy)biphenyl, 4,4'-bis(4-aminophenoxy) biphenyl, bis[4-(3-aminophenoxy)-phenyl]sulfone, bis[4-(4-aminophenoxy)phenyl]sulfone, 2,2-bis[3-(3-aminophenoxy)phenyl]propane, 2,2-bis[3-(4-aminophenoxy)phenyl]propane, 2,2-bis[4-(3-aminophenoxy)phenyl]propane, 2,2-bis[4-(4-aminophenoxy)phenyl]propane, 2,2-bis[3-(3-aminophenoxy)phenyl]hexafluoropropane, 2,2-bis[3-(4-aminophenoxy)phenyl]hexafluoropropane, 2,2-bis[4-(3-aminophenoxy) phenyl]hexafluoropropane, 2,2-bis[4-(4-aminophenoxy)phenyl]hexafluoropropane, 9,9-bis(3-aminophenyl)fluorene, 9,9-bis(4-aminophenyl)fluorene, and the like. Examples of isocyanates which are the compounds represented by the formula (4) wherein the functional group Y is an isocyanate group include those exemplified in the above mentioned diamines in which "amino" is replaced by "isocyanate".

Examples of the diamines in the compounds represented by the formula (5) used as raw materials, wherein the functional group Y is amino group, include bis(3-aminopropyl)tetramethyldisiloxane, bis(10-aminodecamethylene) tetramethyldisiloxane, tetramer and octamer of dimethylsiloxane having aminopropyl at the terminal, bis(3-aminophenoxymethyl) tetramethyldisiloxane, etc. They can be used as a mixture. Examples of the diisocyanates in the compounds represented by the formula (5) wherein the functional group Y is an isocyanate include those exemplified in the above diamines wherein "amino" is replaced by "isocyanate".

The compounds represented by the formulas (4) and (5) wherein the functional group Y is an isocyanate group, i.d. diisocyanates can be easily produced by reacting the corresponding diamine described above with phosgene.

The polyimides of the present invention are novel polyimides produced from the raw materials as described above and are required to have a number average molecular weight of 4,000 to 200,000, and preferably from 8,000 to 100,000. If the number average molecular weight is less than 4,000, the film forming ability becomes insufficient, and the resulted film is inferior in heat resistance even if the film can be formed. If it is unduly high, i.e., exceeding 200,000, the solubility in an organic solvent becomes poor, or if the product is dissolved, due to a high viscosity of the solution, the product is difficult to be processed.

The number average molecular weight used in the present invention is a value determined by gel permeation chromatography (GPC), and indicated as polystyrene using tetrahydrofuran as an eluent and Shodex 80M×2 as columns.

As described above, the preferred polyimide of the present invention includes copolymers of 95 to 40 mol % of at least one of the repeating units represented by the above formulas (1a) and (1b) and from 5 to 60 mol % of at least one of the repeating units represented by the above formulas (2a) and (2b). In these copolymers, if the molar ratio of the repeating unit represented by the formulas (2a) and (2b) is lower than 5 mol %, solubility in solvents becomes inferior, while it is beyond 60 mol %, the resin film formed becomes to have poor heat resistance.

The process for producing the polyimide of the present invention will now be described.

Processes for producing the polyimide using a tetracarboxylic dianhyride and diamines as the raw materials for the polyimide include the following. A process for directly obtaining a polyimide by heating a tetracarboxylic dianhyride and diamines in an organic solvent, optionally in the presence of a catalyst (in an amount of not more than 20 parts by weight of the reactants) such as tributylamine, triethylamine, or triphenyl phosphite to a temperature of not less than 100° C. and preferably not less than 180° C. A process for obtaining a polyimide by reacting a tetracarboxylic dianhyride with diamines in an organic solvent at a temperature of not more than 100° C. to obtain a polyamic acid which is a precursor of the polyimide, optionally adding a dehydrating agent such as p-toluenesulfonic acid (in an amount of 1 to 5 times the mol of the tetracarboxylic dianhydride), and then heating the solution to cause an imidation. A process in which the above-mentioned polyamic acid is caused to undergo a ring closing reaction at a relatively low temperature in a range of from room temperature to 100° C. by adding dehydrating ring closing agent such as an anhydride, e.g., acetic anhydride, propionic anhydride or benzoic anhydride, a carbodiimide compound, e.g., dicyclohexylcarbodiimide, and optionally a ring closing catalyst (as for the dehydrating ring closing agent and ring closing catalyst, in an amount of 2 to 10 times the mol of the tetracarboxylic dianhydride).

Examples of the organic solvents used in these reactions include aprotic polar solvents such as N-methyl-2-pyrrolidone, N,N-dimethylacetamide, N,N-dimethylformamide, dimethylsulfoxide, sulforane, hexamethylphosphoric acid triamide, and 1,3-dimethyl-2-imidazolidone, and phenol solvents such as phenol, cresol, xylenol, and p-chlorophenol. Optionally, solvents such as benzene, toluene, xylene, methyl ethyl ketone, acetone, tetrahydrofuran, dioxane, monoglyme, diglyme, methyl cellosolve, cellosolve acetate, methanol, ethanol, isopropanol, methylene chloride, chloroform, trichloroethylene, and nitrobenzene can be mixed with the above-mentioned solvents as a mixture.

In the case where a tetracarboxylic dianhydride and a diisocyanate are used as the raw materials, the product can be produced according to the above-mentioned process for directly obtaining a polyimide. In this case, the reaction temperature is not less than room temperature, and particularly higher than 60° C.

In the present invention, the polyimides having a high polymerization degree can be produced by the reaction between equimolar amounts of tetracarboxylic dianhydride and the diamine or diisocyanate, but it is possible to produce the polyimide, if necessary, by reacting them with varying the amount of them in a range of from 11:10 to 10:11.

The polyimides obtained by the present invention are soluble in various organic solvents such as aprotic polar solvents, e.g., N-methyl-2-pyrrolidone, N,N-dimethylacetamide, N,N-dimethylformamide, dimethylsulfoxide, sulforane, hexamethylphosphoric acid triamide, and 1,3-dimethyl-2-imidazolidone, and phenol solvents such as phenol, cresol, xylenol, and p-chlorophenol, isophorone, cyclohexanone, carbitol acetate, diglyme, dioxane, tetrahydrofuran, etc., and have a thermal decomposition temperature of higher than 400° C.

Since the polyimides of the present invention are soluble in various organic solvent from low boiling point solvents to high boiling point solvent as described above, they have a merit of easy molding and processing. Also, they have a softening temperature and excellent heat resistance at the same time. According to the present invention, novel polyimides can be easily produced in a high yield and, consequently, the polyimides obtained by the present invention have widened applied fields as varnish, molded articles, adhesives, constructing materials, and the like.

EXAMPLE

The present invention will now be described in greater detail.

Example 1

Into a flask equipped with a stirrer were introduced 12.34 g (67 mmol) of 3,4'-diaminobiphenyl, 8.20 g (33 mmol) of 1,3-bis(3-aminopropyl)-1,1, 3,3-tetramethyldisiloxane, 35.83 g (100 mmol) of 3,3',4,4'-diphenylsulfonetetracarboxylic dianhydride, and 300 ml of N-methyl-2-pyrrolidone at an iced temperature, and stirring was continued for 1 hour. Consequently, the solution was reacted at room temperature for 3 hours to synthesize a polyamic acid.

To the resultant polyamic acid were added 50 ml of toluene and 1.0g of p-toluenesulfonic acid, the mixture was heated to 160° C., and an imidation reaction was carried out for 3 hours while separating water which was flowed by being azeotropically distilled with toluene. After toluene was distilled off, the resultant polyimide varnish was poured in methanol, followed by separation of the resultant precipitate, pulverization, washing, and drying stages to obtain 50.0 g (yield: 95%) of a polyimide having a molar ratio of the repeating units of [(1a)+(1b)]:[(2a)+(2b)]m 67:33 wherein (1a):(1b)=100:0 and (2a):(2b)=100:0.

The IR spectrum measurement of the resultant polyimide resin showed typical absorption bands of imide at 1718 $cm^{-1}$ and 1783 $cm^{-1}$. The molecular weight, glass transition point and temperature of initiating thermal decomposition of the polyimide were determined. The results are shown in Table 1.

The solubility of this polyimide was confirmed by observing the state of the solution after 5% by weight solution was left standing for 12 hours at room temperature. As a result, the polyimide was soluble in solvents of N-methyl-2-pyrrolidone, N,N-dimethylacetamide, N,N-dimethylformamide, dimethylsulfoxide, sulforane, hexamethylphosphoric acid triamide, 1,3-dimethyl-2-imidazolidone, phenol, cresol, xylenol, p-chlorophenol, cyclohexanone, carbitol acetate, diglyme, dioxane, and tetrahydrofuran (THF).

The polyimide was dissolved in THF so as to be a concentration of 20% by weight, the resultant varnish was cast on a glass plate, dried at 100° C. for 10 minutes. This gave a nearly colorless transparent self-supporting tough film. When the film was bent 180 degree in order to carry out a flexibility test, the film showed good flexibility without cracking.

Example 2

Using 13.41 g (67 mmol) of 4,4'-oxydianiline, 8.20 g (33 mmol) of 1,3-bis(3-aminopropyl)-1,1,3,3-tetramethyldisiloxane, 35.83 g (100 mmol) of 3,3',4,4'-diphenylsulfonetetracarboxylic dianhydride, and 300 ml of N-methyl-2-pyrrolidone, a polyimide resin having a molar ratio of the repeating units of [(1a)+(1b)]:[(2a)+(2b)]=67:33 wherein (1a):(1b)=100:0 and (2a):(2b)=100:0 was obtained in an amount of 51.0 g (yield: 95%) by the same manner as in Example 1.

The IR spectrum measurement of the resultant polyimide showed typical absorption bands of imide at 1718 $cm^{-1}$ and 1783 $cm^{-1}$. The molecular weight, glass transition point and temperature of initiating thermal decomposition of the polyimide were determined. The results are shown in Table 1.

When the solubility of this polyimide was confirmed by the same manner as in Example 1, the polyimide was soluble in the same solvents as described in Example 1.

A nearly colorless and transparent self-supporting tough film was formed by the same manner as in Example 1. When the film was bent 180 degree in order to carry out a flexibility test, the film showed good flexibility without cracking.

Example 3

Using 13.29 g (67 mmol) of 4,4'-diaminodiphenylmethane, 8.20 g (33 mmol) of 1,3-bis(3-aminopropyl)-1,1,3,3-tetramethyldisiloxane, 35.83 g (100 mmol) of 3,3',4,4'-diphenylsulfonetetracarboxylic dianhydride, and 300 ml of N-methyl-2-pyrrolidone, a polyimide resin having a molar ratio of the repeating units of [(1a)+(1b)]:[(2a)+(2b)]=67:33 wherein (1a):(1b)=100:0 and (2a):(2b)=100:0 was obtained in an amount of 52.0 g (yield: 97%) by the same manner as in Example 1.

The IR spectrum measurement of the resultant polyimide showed typical absorption bands of imide at 1718 $cm^{-1}$ and 1783 $cm^{-1}$. The molecular weight, glass transition point and temperature of initiating thermal decomposition of the polyimide were determined. The results are shown in Table 1.

When the solubility of this polyimide was confirmed by the same manner as in Example 1, the polyimide was soluble in the same solvents as described in Example 1.

A nearly colorless and transparent self-supporting tough film was formed by the same manner as in Example 1. When the film was bent 180 degree in order to carry out a flexibility test, the film showed good flexibility without cracking.

Example 4

Using 14.49 g (67 mmol) of 4,4'-diaminodiphenyl sulfide, 8.20 g (33 mmol) of 1,3-bis(3-aminopropyl)-1,1,3,3-tetramethyldisiloxane, 35.83 g (100 mmol) of 3,3',4,4'-diphenylsulfonetetracarboxylic dianhydride, and 300 ml of N-methyl-2-pyrrolidone, a polyimide resin having a molar ratio of the repeating units of [(1a)+(1b)]:[(2a)+(2b)]=67:33 wherein (1a):(1b)=100:0 and (2a):(2b)=100:0 was obtained in an amount of 51.0 g (yield: 93%) by the same manner as in Example 1.

The IR spectrum measurement of the resultant polyimide showed typical absorption bands of imide at 1718 $cm^{-1}$ and 1780 $cm^{-1}$. The molecular weight, glass transition point and temperature of initiating thermal decomposition of the polyimide were determined. The results are shown in Table 1.

When the solubility of this polyimide was confirmed by the same manner as in Example 1, the polyimide was soluble in the same solvents as described in Example 1.

A nearly colorless and transparent self-supporting tough film was formed by the same manner as in Example 1. When the film was bent 180 degree in order to carry out a flexibility test, the film showed good flexibility without cracking.

Example 5

Using 16.64 g (67 mmol) of 3,3'-diaminodiphenyl sulfone, 8.20 g (33 mmol) of 1,3-bis(3-aminopropyl)-1,1,3,3-tetramethyldisiloxane, 35.83 g (100 mmol) of 3,3',4,4'-diphenylsulfonetetracarboxylic dianhydride, and 300 ml of N-methyl-2-pyrrolidone, a polyimide resin having a molar ratio of the repeating units of [(1a)+(1b)]:[(2a)+(2b)]=67:33 wherein (1a):(1b)=100:0 and (2a):(2b)=100:0 was obtained in an amount of 51.5 g (yield: 90%) by the same manner as in Example 1.

The IR spectrum measurement of the resultant polyimide showed typical absorption bands of imide at 1715 $cm^{-1}$ and 1783 $cm^{-1}$ The molecular weight, glass transition point and temperature of initiating thermal decomposition of the polyimide were determined. The results are shown in Table 1.

When the solubility of this polyimide was confirmed by the same manner as in Example 1, the polyimide was soluble in the same solvents as described in Example 1.

A nearly colorless and transparent self-supporting tough film was formed by the same manner as in Example 1. When the film was bent 180 degree in order to carry out a flexibility test, the film showed good flexibility without cracking.

Example 6

Using 15.16 g (67 mmol) of 2,2-bis(4-aminophenyl) propane, 8.20 g (33 mmol) of 1,3-bis(3-aminopropyl)-1,1,3,3-tetramethyldisiloxane, 35.83 g (100 mmol) of 3,3',4,4'-diphenylsulfonetetracarboxylic dianhydride, and 300 ml of N-methyl-2-pyrrolidone, a polyimide having a molar ratio of the repeating units of [(1a)+(1b)]:[(2a)+(2b)]=67:33 wherein (1a):(1b)=100:0 and (2a):(2b)=100:0 was obtained in an amount of 54.0 g (yield: 97%) by the same manner as in Example 1.

The IR spectrum measurement of the resultant polyimide showed typical absorption bands of imide at 1718 cm$^{-1}$ and 1783 cm$^{-1}$. The results of measuring the molecular weight, glass transition point and temperature of initiating thermal decomposition of the polyimide are shown in Table 1.

When the solubility of this polyimide was confirmed by the same manner as in Example 1, the polyimide was soluble in the same solvents as described in Example 1.

A nearly colorless and transparent self-supporting tough film was formed by the same manner as in Example 1. When the film was bent 180 degree in order to carry out a flexibility test, the film showed good flexibility without cracking.

Example 7

Using 22.40 g (67 mmol) of 2,2-bis(4-aminophenyl)hexafluoropropane, 8.20 g (33 mmol) of 1,3-bis(3-aminopropyl)-1,1,3,3-tetramethyldisiloxane, 35.83 g (100 mmol) of 3,3',4,4'-diphenylsulfonetetracarboxylic dianhydride, and 300 ml of N-methyl-2-pyrrolidone, a polyimide having a molar ratio of the repeating units of [(1a)+(1b)]:[(2a)+(2b)]=67:33 wherein (1a):(1b)=100:0 and (2a):(2b)=100:0 was obtained in an amount of 60. 0 g (yield: 95%) by the same manner as in Example 1.

The IR spectrum measurement of the resultant polyimide showed typical absorption bands of imide at 1721 cm$^{-1}$ and 1783 cm$^{-1}$. The results of measuring the molecular weight, glass transition point and temperature of initiating thermal decomposition of the polyimide are shown in Table 1.

When the solubility of this polyimide was confirmed by the same manner as in Example 1, the polyimide was soluble in the same solvents as described in Example 1.

A nearly colorless and transparent self-supporting tough film was formed by the same manner as in Example 1. When the film was bent 180 degree in order to carry out a flexibility test, the film showed good flexibility without cracking.

Example 8

Using 19.58 g (67 mmol) of 1,4-bis(4-aminophenoxy)benzene, 8.20 g (33 mmol) of 1,3-bis(3-aminopropyl)-1,1,3,3-tetramethyldisiloxane, 35.83 g (100 mmol) of 3,3',4,4'-diphenylsulfonetetracarboxylic dianhydride, and 300 ml of N-methyl-2-pyrrolidone, a polyimide having a molar ratio of the repeating units of [(1a)+(1b)]:[(2a)+(2b)]=67:33 wherein (1a):(1b)=100:0 and (2a):(2b)=100:0 was obtained in an amount of 58.0 g (yield: 97%) by the same manner as in Example 1.

The IR spectrum measurement of the resultant polyimide showed typical absorption bands of imide at 1718 cm$^{-1}$ and 1780 cm$^{-1}$. The results of measuring the molecular weight, glass transition point and temperature of initiating thermal decomposition of the polyimide are shown in Table 1.

When the solubility of this polyimide was confirmed by the same manner as in Example 1, the polyimide was soluble in the same solvents as described in Example 1.

A nearly colorless and transparent self-supporting tough film was formed by the same manner as in Example 1. When the film was bent 180 degree in order to carry out a flexibility test, the film showed good flexibility without cracking.

Example 9

Using 19.58 g (67 mmol) of 1,3-bis(4-aminophenoxy)benzene, 8.20 g (33 mmol) of 1,3-bis(3-aminopropyl)-1,1,3,3-tetramethyldisiloxane, 35.83 g ( 100 mmol) of 3,3',4,4'-diphenylsulfonetetracarboxylic dianhydride, and 300 ml of N-methyl-2-pyrrolidone, a polyimide having a molar ratio of the repeating units of [(1a)+(1b)]:[(2a)+(2b)]=67: 33 wherein (1a):(1b)=100:0 and (2a):(2b)=100:0 was obtained in an amount of 58.0 g (yield: 97%) by the same manner as in Example 1.

The IR spectrum measurement of the resultant polyimide showed typical absorption bands of imide at 1718 cm$^{-1}$ and 1780 cm$^{-1}$. The results of measuring the molecular weight, glass transition point and temperature of initiating thermal decomposition of the polyimide are shown in Table 1.

When the solubility of this polyimide was confirmed by the same manner as in Example 1, the polyimide was soluble in the same solvents as described in Example 1.

A nearly colorless and transparent self-supporting tough film was formed by the same manner as in Example 1. When the film was bent 180 degree in order to carry out a flexibility test, the film showed good flexibility without cracking.

Example 10

Using 23.08 g (67 mmol) of 1,3-bis(4-aminophenyl)-1-methylethyl]benzene, 8.20 g (33 mmol) of 1,3-bis(3-aminopropyl)-1,1,3,3-tetramethyldisiloxane, 35.83 g (100 mmol) of 3,3',4,4'-diphenylsulfonetetracarboxylic dianhydride and 300 ml of N-methyl-2-pyrrolidone, a polyimide having a molar ratio of the repeating units of [(1a)+(1b)]:[(2a)+(2b)]=67:33 wherein (1a):(1b)=100:0 and (2a):(2b)=100:0 was obtained in an amount of 62.5 g (yield: 98%) by the same manner as in Example 1.

The IR spectrum measurement of the resultant polyimide showed typical absorption bands of imide at 1718 cm$^{-1}$ and 1783 cm$^{-1}$. The results of measuring the molecular weight, glass transition point and temperature of initiating thermal decomposition of the polyimide are shown in Table 1.

When the solubility of this polyimide was confirmed by the same manner as in Example 1, the polyimide was soluble in the same solvents as described in Example 1.

A nearly colorless and transparent self-supporting tough film was formed by the same manner as in Example 1. When the film was bent 180 degree in order to carry out a flexibility test, the film showed good flexibility without cracking.

Example 11

Using 24.68 g (67 mmol) of bis(4-aminophenoxy)biphenyl, 8.20 g (33 mmol) of 1,3-bis(3-aminopropyl)-1,1,3,3-tetramethyldisiloxane, 35.83 g (100 mmol) of 3,3',4,4'-diphenylsulfonetetracarboxylic dianhydride and 300 ml of N-methyl-2-pyrrolidone, a polyimide having a molar ratio of the repeating units of [(1a)+(1b)]:[(2a)+(2b)]=67:33 wherein (1a):(1b)=100:0 and (2a).:(2b)=100:0 was obtained in an amount of 64.0 g (yield: 98%) by the same manner as in Example 1.

The IR spectrum measurement of the resultant polyimide showed typical absorption bands of imide at 1718 cm$^{-1}$ and 1783 cm$^{-1}$. The results of measuring the molecular weight, glass transition point and temperature of initiating thermal decomposition of the polyimide are shown in Table 1.

When the solubility of this polyimide was confirmed by the same manner as in Example 1, the polyimide was soluble in the same solvents as described in Example 1.

A nearly colorless and transparent self-supporting tough film was formed by the same manner as in Example 1. When the film was bent 180 degree in order to carry out a flexibility test, the film showed good flexibility without cracking.

Example 12

Using 25.75 g (67 mmol) of bis(4-aminophenoxy)-diphenyl ether, 8.20 g (33 mmol) of 1,3-bis(3-aminopropyl)-1,1,3,3-tetramethyldisiloxane, 35.83 g (100 mmol) of 3,3',4,4'-diphenylsulfonetetracarboxylic dianhydride and 300 ml of N-methyl-2-pyrrolidone, a polyimide having a molar ratio of the repeating units of [(1a)+(1b)]: [(2a)+(2b)]=67:33 wherein (1a):(1b)=100: 0 and (2a):(2b) m 100: 0 was obtained in an amount of 64.0 g (yield: 97%) by the same manner as in Example 1.

The IR spectrum measurement of the resultant polyimide showed typical absorption bands of imide at 1718 cm$^{-1}$ and 1780 cm$^{-1}$. The results of measuring the molecular weight, glass transition point and temperature of initiating thermal decomposition of the polyimide are shown in Table 1.

When the solubility of this polyimide was confirmed by the same manner as in Example 1, the polyimide was soluble in the same solvents as described in Example 1.

A nearly colorless and transparent self-supporting tough film was formed by the same manner as in Example 1. When the film was bent 180 degree in order to carry out a flexibility test, the film showed good flexibility without cracking.

Example 13

Using 28.98 g (67 mmol) of bis[4-(4-aminophenoxy)phenyl]sulfone, 8.20 g (33 mmol) of 1,3-bis(3-aminopropyl)-1,1,3,3,-tetramethyldisiloxane, 35.83 g (100 mmol) of 3,3',4,4'-diphenylsulfonetetracarboxylic dianhydride and 300 ml of N-methyl-2-pyrrolidone, a polyimide having a molar ratio of the repeating units of [(1a)+(1b)]:[(2a)+(2b)]=67:33 wherein (1a):(1b)=100:0 and (2a):(2b)=100:0 was obtained in an amount of 65.0 g (yield: 94%) by the same manner as in Example 1.

The IR spectrum measurement of the resultant polyimide showed typical absorption bands of imide at 1719 cm$^{-1}$ and 1785 cm$^{-1}$. The results of measuring the molecular weight, glass transition point and temperature of initiating thermal decomposition of the polyimide are shown in Table 1.

When the solubility of this polyimide was confirmed by the same manner as in Example 1, the polyimide was soluble in the same solvents as described in Example 1.

A nearly colorless and transparent self-supporting tough film was formed by the same manner as in Example 1. When the film was bent 180 degree in order to carry out a flexibility test, the film showed good flexibility without cracking.

Example 14

Using 27.50 g (67 mmol) of 2,2-bis[4-(4-aminophenoxy)phenyl]propane, 8.20 g (33 mmol) of 1,3-bis(3-aminopropyl)-1,1,3,3-tetramethyldisiloxane, 35.83 g (100 mmol) of 3,3',4,4'-diphenylsulfonetetracarboxylic dianhydride and 300 ml of N-methyl-2-pyrrolidone, a polyimide having a molar ratio of the repeating units of [(1a)+(1b)]:[(2a)+(2b)]=67:33 wherein (1a):(1b)=100:0 and (2a):(2b)=100:0 was obtained in an amount of 65.0 g (yield: 96%) by the same manner as in Example 1.

The IR spectrum measurement of the resultant polyimide showed typical absorption bands of imide at 1720 cm$^{-1}$ and 1783 cm$^{-1}$. The results of measuring the molecular weight, glass transition point and temperature of initiating thermal decomposition of the polyimide are shown in Table 1.

When the solubility of this polyimide was confirmed by the same manner as in Example 1, the polyimide was soluble in the same solvents as described in Example 1.

A nearly colorless and transparent self-supporting tough film was formed by the same manner as in Example 1. When the film was bent 180 degree in order to carry out a flexibility test, the film showed good flexibility without cracking.

Example 15

Using 34.74 g (67 mmol) of 2,2-bis[4-(4-aminophenoxy)phenyl]hexafluoropropane, 8.20 g (33 mmol) of 1,3-bis(3-aminopropyl)-1,1,3,3-tetramethyldisiloxane, 35.83 g (100 mmol) of 3,3',4,4'-diphenylsulfonetetracarboxylic dianhydride and 300 ml of N-methyl-2-pyrrolidone, a polyimide having a molar ratio of the repeating units of [(1a)+(1b)]:[(2a)+(2b)]=67:33 wherein (1a):(1b)=100:0 and (2a):(2b)=100:0 was obtained in an amount of 74.0 g (yield: 98%) by the same manner as in Example 1.

The IR spectrum measurement of the resultant polyimide showed typical absorption bands of imide at 1715 cm$^{-1}$ and 1786 cm$^{-1}$. The results of measuring the molecular weight, glass transition point and temperature of initiating thermal decomposition of the polyimide are shown in Table 1.

When the solubility of this polyimide was confirmed by the same manner as in Example 1, the polyimide was soluble in the same solvents as described in Example 1.

A nearly colorless and transparent self-supporting tough film was formed by the same manner as in Example 1. When the film was bent 180 degree in order to carry out a flexibility test, the film showed good flexibility without cracking.

Example 16

Using 23.35 g (67 mmol) of 9,9-bis(4-aminophenoxy)fluorene, 8.20 g (33 mmol) of 1,3-bis(3-aminopropyl)-1,1,3,3-tetramethyldisiloxane, 35.83 g (100 mmol) of 3,3',4,4'-diphenylsulfonetetracarboxylic dianhydride and 300 ml of N-methyl-2-pyrrolidone, a polyimide having a molar ratio of the repeating units of [(1a)+(1b)]:[(2a)+(2b)]=67:33 wherein (1a):(1b)=100:0 and (2a):(2b)=100:0 was obtained in an amount of 60.5 g (yield: 95%) by the same manner as in Example 1.

The IR spectrum measurement of the resultant polyimide showed typical absorption bands of imide at 1720 cm$^{-1}$ and 1780 cm$^{-1}$. The results of measuring the molecular weight, glass transition point and temperature of initiating thermal decomposition of the polyimide are shown in Table 1.

When the solubility of this polyimide was confirmed by the same manner as in Example 1, the polyimide was soluble in the same solvents as described In Example 1.

A nearly colorless and transparent self-supporting tough film was formed by the same manner as in Example 1. When the film was bent 180 degree in order to carry out a flexibility test, the film showed good flexibility without cracking.

Example 17

Using 13.82 g (75 mmol) of 3,4'-diaminobiphenyl, 6.21 g (25 mmol) of 1,3-bis(3-aminopropyl)-1,1,3,3-tetramethyldisiloxane, 41.03 g (100 mmol) of ethylene glycol bistrimellitate dianhydride and 300 ml of N-methyl-2-pyrrolidone, a polyimide having a molar ratio of the repeating units of [(1a)+(1b)]:[(2a)+(2b)]=75:25 wherein (1a):(1b)=0:100 and (2a):(2b)=0:100 was obtained in an amount of 54.0 g (yield: 94%) by the same manner as in Example 1.

The IR spectrum measurement of the resultant polyimide showed typical absorption bands of imide at 1718 cm$^{-1}$ and 1783 cm$^{-1}$. The results of measuring the molecular weight, glass transition point and temperature of initiating thermal decomposition of the polyimide are shown in Table 1.

When the solubility of this polyimide was confirmed by the same manner as in Example 1, the polyimide was soluble in the same solvents as described in Example 1.

A nearly colorless and transparent self-supporting tough film was formed by the same manner as in Example 1. When the film was bent 180 degree in order to carry out a flexibility test, the film showed good flexibility without cracking.

Example 18

Using 15.02 g (75 mmol) of 4,4'-oxydianiline, 6.21 g (25 mmol) of 1,3-bis(3-aminopropyl)-1,1,3,3-tetramethyldisiloxane, 41.03 g (100 mmol) of ethylene glycol bistrimellitate dianhydride and 300 ml of N-methyl-2-pyrrolidone, a polyimide having a molar ratio of the repeating units of [(1a)+(1b)]:[(2a)+(2b)]=75:25 wherein (1a):(1b)=0:100 and (2a):(2b)=0:100 was obtained in an amount of 52.0 g (yield: 89%) by the same manner as in Example 1.

The IR spectrum measurement of the resultant polyimide showed typical absorption bands of imide at 1718 cm$^{-1}$ and 1783 cm$^{-1}$. The results of measuring the molecular weight, glass transition point and temperature of initiating thermal decomposition of the polyimide are shown in Table 1.

When the solubility of this polyimide was confirmed by the same manner as in Example 1, the polyimide was soluble in the same solvents as described in Example 1.

A nearly colorless and transparent self-supporting tough film was formed by the same manner as in Example 1. When the film was bent 180 degree in order to carry out a flexibility test, the film showed good flexibility without cracking.

Example 19

Using 14.87 g (75 mmol) of 4,4'-diaminodiphenylmethane, 6.21 g (25 mmol) of 1,3-bis(3-aminopropyl)-1,1,3,3-tetramethyldisiloxane, 41.03 g (100 mmol) of ethylene glycol bistrimellitate dianhydride and 300 ml of N-methyl-2-pyrrolidone, a polyimide having a molar ratio of the repeating units of [(1a)+(1b)]: [(2a)+(2b)]=75:25 wherein (1a):(1b)=0:100 and (2a):(2b)=0:100 was obtained in an amount of 55.0 g (yield: 94%) by the same manner as in Example 1.

The IR spectrum measurement of the resultant polyimide showed typical absorption bands of imide at 1718 cm$^{-1}$ and 1783 cm$^{-1}$. The results of measuring the molecular weight, glass transition point and temperature of initiating thermal decomposition of the polyimide are shown in Table 1.

When the solubility of this polyimide was confirmed by the same manner as in Example 1, the polyimide was soluble in the same solvents as described in Example 1.

A nearly colorless and transparent self-supporting tough film was formed by the same manner as in Example 1. When the film was bent 180 degree in order to carry out a flexibility test, the film showed good flexibility without cracking.

Example 20

Using 16.22 g (75 mmol) of 4,4'-diaminodiphenyl sulfide, 6.21 g (25 mmol) of 1,3-bis(3-aminopropyl)-1,1,3,3-tetramethyldisiloxane, 41.03 g (100 mmol) of ethylene glycol bistrimellitate dianhydride and 300 ml of N-methyl-2-pyrrolidone, a polyimide having a molar ratio of the repeating units of [(1a)+(1b)]:[(2a)+(2b)]=75:25 wherein (1a):(1b)=0:100 and (2a):(2b)=0:100 was obtained in an amount of 54.0 g (yield: 90%) by the same manner as in Example 1.

The IR spectrum measurement of the resultant polyimide showed typical absorption bands of imide at 1718 cm$^{-1}$ and 1780 cm$^{-1}$. The results of measuring the molecular weight, glass transition point and temperature of initiating thermal decomposition of the polyimide are shown in Table 1.

When the solubility of this polyimide was confirmed by the same manner as in Example 1, the polyimide was soluble in the same solvents as described in Example 1.

A nearly colorless and transparent self-supporting tough film was formed by the same manner as in Example 1. When the film was bent 180 degree in order to carry out a flexibility test, the film showed good flexibility without cracking.

Example 21

Using 18.63 g (75 mmol) of 3,3'-diaminodiphenyl sulfone, 6.21 g (25 mmol) of 1,3-bis(3-aminopropyl)-1,1,3,3-tetramethyldisiloxane, 41.03 g (100 mmol) of ethylene glycol bistrimellitate dianhydride and 300 ml of N-methyl-2-pyrrolidone, a polyimide having a molar ratio of the repeating units of [(1a)+(1b)]:[(2a)+(2b)]=75:25 wherein (1a):(1b)=0:100 and (2a):(2b)=0:100 was obtained in an amount of 55.5 g (yield: 89%) by the same manner as in Example 1.

The IR spectrum measurement of the resultant polyimide showed typical absorption bands of imide at 1715 cm$^{-1}$ and 1783 cm$^{-1}$. The results of measuring the molecular weight, glass transition point and temperature of initiating thermal decomposition of the polyimide are shown in Table 1.

When the solubility of this polyimide was confirmed by the same manner as in Example 1, the polyimide was soluble in the same solvents as described in Example 1.

A nearly colorless and transparent self-supporting tough film was formed by the same manner as in Example 1. When the film was bent 180 degree in order to carry out a flexibility test, the film showed good flexibility without cracking.

Example 22

Using 16.97 g (75 mmol) of 2,2-bis(4-aminophenyl)propane, 6.21 g (25 mmol) of 1,3-bis(3-aminopropyl)-1,1,3,3-tetramethyldisiloxane, 41.03 g (100 mmol) of ethylene glycol bistrimellitate dianhydride and 300 ml of N-methyl-2-pyrrolidone, a polyimide having a molar ratio of the repeating units of [(1a)+(1b)]: [(2a)+(2b)]=75:25 wherein (1a):(1b)=0:100 and (2a):(2b)=0:100 was obtained in an amount of 57.0 g (yield: 94%) by the same manner as in Example 1.

The IR spectrum measurement of the resultant polyimide showed typical absorption bands of imide at 1718 cm$^{-1}$ and 1783 cm$^{-1}$. The results of measuring the molecular weight, glass transition point and temperature of initiating thermal decomposition of the polyimide are shown in Table 1.

When the solubility of this polyimide was confirmed by the same manner as in Example 1, the polyimide was soluble in the same solvents as described in Example 1.

A nearly colorless and transparent self-supporting tough film was formed by the same manner as in Example 1. When the film was bent 180 degree in order to carry out a flexibility test, the film showed good flexibility without cracking.

Example 23

Using 25.07 g (75 mmol) of 2,2-bis(4-aminophenyl)hexafluoropropane, 6.21 g (25 mmol) of 1,3-bis(3-aminopropyl)-1,1,3,3-tetramethyldisiloxane, 41.03 g (100 mmol) of ethylene glycol bistrimellitate dianhydride and 300 ml of N-methyl-2-pyrrolidone, a polyimide having a molar ratio of the repeating units of [(1a)+(1b)]|[(2a)+(2b)]

=75:25 wherein (1a):(1b)=0:100 and (2a):(2b)=0:100 was obtained in an amount of 67.0 g (yield: 98%) by the same manner as in Example 1.

The IR spectrum measurement of the resultant polyimide showed typical absorption bands of imide at 1721 cm$^{-1}$ and 1783 cm$^{-1}$. The results of measuring the molecular weight, glass transition point and temperature of initiating thermal decomposition of the polyimide are shown in Table 1.

When the solubility of this polyimide was confirmed by the same manner as in Example 1, the polyimide was soluble in the same solvents as described in Example 1.

A nearly colorless and transparent self-supporting tough film was formed by the same manner as in Example 1. When the film was bent 180 degree in order to carry out a flexibility test, the film showed good flexibility without cracking.

Example 24

Using 21.92 g (75 mmol) of 1,4-bis(4-aminophenoxy) benzene, 6.21 g (25 mmol) of 1,3-bis(3-aminopropyl)-1,1, 3,3-tetramethyldisiloxane, 41.03 g (100 mmol) of ethylene glycol bistrimellitate dianhydride and 300 ml of N-methyl-2-pyrrolidone, a polyimide having a molar ratio of the repeating units of [(1a)+(1b)]: [(2a)+(2b)]=75:25 wherein (1a):(1b)=0:100 and (2a):(2b)=0:100 was obtained in an amount of 62.0 g (yield: 95%) by the same manner as in Example 1.

The IR spectrum measurement of the resultant polyimide showed typical absorption bands of imide at 1718 cm$^{-1}$ and 1780 cm$^{-1}$. The results of measuring the molecular weight, glass transition point and temperature of initiating thermal decomposition of the polyimide are shown in Table 1.

When the solubility of this polyimide was confirmed by the same manner as in Example 1, the polyimide was soluble in the same solvents as described in Example 1.

A nearly colorless and transparent self-supporting tough film was formed by the same manner as in Example 1. When the film was bent 180 degree in order to carry out a flexibility test, the film showed good flexibility without cracking.

Example 25

Using 21.92 g (75 mmol) of 1,3-bis( 4-aminophenoxy) benzene, 6.21 g (25 mmol) of 1,3-bis(3-aminopropyl)-1,1, 3,3-tetramethyldisiloxane, 41.03 g (100 mmol) of ethylene glycol bistrimellitate dianhydride and 300 ml of N-methyl-2-pyrrolidone, a polyimide having a molar ratio of the repeating units of [(1a)+(1b)]: [(2a)+(2b)]=75:25 wherein (1a):(1b)=0:100 and (2a):(2b)=0:100 was obtained in an amount of 64.0 g (yield: 97%) by the same manner as in Example 1.

The IR spectrum measurement of the resultant polyimide showed typical absorption bands of imide at 1718 cm$^{-1}$ and 1780 cm$^{-1}$. The results of measuring the molecular weight, glass transition point and temperature of initiating thermal decomposition of the polyimide are shown in Table 1.

When the solubility of this polyimide was confirmed by the same manner as in Example 1, the polyimide was soluble in the same solvents as described in Example 1.

A nearly colorless and transparent self-supporting tough film was formed by the same manner as in Example 1. When the film was bent 180 degree in order to carry out a flexibility test, the film showed good flexibility without cracking.

Example 26

Using 25.84 g (75 mmol) of 1,3-bis[1-(4-aminophenyl)-1-methylethyl]benzene, 6.21 g (25 mmol) of 1,3-bis(3-aminopropyl)-1,1,3,3-tetramethyldisiloxane, 41.03 g (100 mmol) of ethylene glycol bistrimellitate dianhydride and 300 ml of N-methyl-2-pyrrolidone, a polyimide having a molar ratio of the repeating units of [(1a)+(1b)]: [(2a)+(2b)]=75:25 wherein (1a):(1b)=0:100 and (2a):(2b)=0:100 was obtained in an amount of 67.0 g (yield: 96%) by the same manner as in Example 1.

The IR spectrum measurement of the resultant polyimide showed typical absorption bands of imide at 1718 cm$^{-1}$ and 1783 cm$^{-1}$. The results of measuring the molecular weight, glass transition point and temperature of initiating thermal decomposition of the polyimide are shown in Table 1.

When the solubility of this polyimide was confirmed by the same manner as in Example 1, the polyimide was soluble in the same solvents as described in Example 1.

A nearly colorless and transparent self-supporting tough film was formed by the same manner as in Example 1. When the film was bent 180 degree in order to carry out a flexibility test, the film showed good flexibility without cracking.

Example 27

Using 27.63 g (75 mmol) of bis(4-aminophenoxy) biphenyl, 6.21 g (25 mmol) of 1,3-bis(3-aminopropyl)-1,1, 3,3-tetramethyldisiloxane, 41.03 g (100 mmol) of ethylene glycol bistrimellitate dianhydride and 300 ml of N-methyl-2-pyrrolidone, a polyimide having a molar ratio of the repeating units of [(1a)+(1b)]: [(2a)+(2b)]=75:25 wherein (1a):(1b)=0:100 and (2a):(2b)=0:100 was obtained in an amount of 69.5 g (yield: 98%) by the same manner as in Example 1.

The IR spectrum measurement of the resultant polyimide showed typical absorption bands of imide at 1718 cm$^{-1}$ and 1780 cm$^{-1}$. The results of measuring the molecular weight, glass transition point and temperature of initiating thermal decomposition of the polyimide are shown in Table 1.

When the solubility of this polyimide was confirmed by the same manner as in Example 1, the polyimide was soluble in the same solvents as described in Example 1.

A nearly colorless and transparent self-supporting tough film was formed by the same manner as in Example 1. When the film was bent 180 degree in order to carry out a flexibility test, the film showed good flexibility without cracking.

Example 28

Using 28.82 g (75 mmol) of bis(4-aminophenoxy) diphenyl ether, 6.21 g (25 mmol) of 1,3-bis(3-aminopropyl)-1,1,3,3-tetramethyldisiloxane, 41.03 g (100 mmol) of ethylene glycol bistrimellitate dianhydride and 300 ml of N-methyl-2-pyrrolidone, a polyimide having a molar ratio of the repeating units of [(1a)+(1b)]: [(2a)+(2b)]=75:25 wherein (1a):(1b)=0:100 and (2a):(2b)=0:100 was obtained in an amount of 70.0 g (yield: 97%) by the same manner as in Example 1.

The IR spectrum measurement of the resultant polyimide showed typical absorption bands of imide at 1718 cm$^{-1}$ and 1783 cm$^{-1}$. The results of measuring the molecular weight, glass transition point and temperature of initiating thermal decomposition of the polyimide are shown in Table 1.

When the solubility of this polyimide was confirmed by the same manner as in Example 1, the polyimide was soluble in the same solvents as described in Example 1.

A nearly colorless and transparent self-supporting tough film was formed by the same manner as in Example 1. When the film was bent 180 degree in order to carry out a flexibility test, the film showed good flexibility without cracking.

Example 29

Using 32.08 g (75 mmol) of bis[4-(4-aminophenoxy)phenyl]sulfone, 6.21 g (25 mmol) of 1,3-bis(3-aminopropyl)-1,1,3,3-tetramethyldisiloxane, 41.03 g (100 mmol) of ethylene glycol bistrimellitate dianhydride and 300 ml of N-methyl-2-pyrrolidone, a polyimide having a molar ratio of the repeating units of [(1a)+(1b)]: [(2a)+(2b)]=75:25 wherein (1a):(1b)=0:100 and (2a):(2b)=0:100 was obtained in an amount of 74.0 g (yield: 97%) by the same manner as in Example 1.

The IR spectrum measurement of the resultant polyimide showed typical absorption bands of imide at 1719 $cm^{-1}$ and 1785 $cm^{-1}$. The results of measuring the molecular weight, glass transition point and temperature of initiating thermal decomposition of the polyimide are shown in Table 1.

When the solubility of this polyimide was confirmed by the same manner as in Example 1, the polyimide was soluble in the same solvents as described in Example 1.

A nearly colorless and transparent self-supporting tough film was formed by the same manner as in Example 1. When the film was bent 180 degree in order to carry out a flexibility test, the film showed good flexibility without cracking.

Example 30

Using 30.78 g (75 mmol) of 2,2-bis[4-(4-aminophenoxy)phenyl]propane, 6.21 g (25 mmol) of 1,3-bis(3-aminopropyl)-1,1,3,3-tetramethyldisiloxane, 41.03 g (100 mmol) of ethylene glycol bistrimellitate dianhydride and 300 ml of N-methyl-2-pyrrolidone, a polyimide having a molar ratio of the repeating units of [(1a)+(1b)]: [(2a)+(2b)]=75:25 wherein (1a): (1b)=0:100 and (2a):(2b)=0:100 was obtained in an amount of 73.0 g (yield: 98%) by the same manner as in Example 1.

The IR spectrum measurement of the resultant polyimide showed typical absorption bands of imide at 1720 $cm^{-1}$ and 1783 $cm^{-1}$. The results of measuring the molecular weight, glass transition point and temperature of initiating thermal decomposition of the polyimide are shown in Table 1.

When the solubility of this polyimide was confirmed by the same manner as in Example 1, the polyimide was soluble in the same solvents as described in Example 1.

A nearly colorless and transparent self-supporting tough film was formed by the same manner as in Example 1. When the film was bent 180 degree in order to carry out a flexibility test, the film showed good flexibility without cracking.

Example 31

Using 38.89 g (75 mmol) of 2,2-bis[4-(4-aminophenoxy)phenyl]hexafluoropropane, 6.21 g (25 mmol) of 1,3-bis(3-aminopropyl)-1,1,3,3-tetramethyldisiloxane, 41.03 g (100 mmol) of ethylene glycol bistrimellitate dianhydride and 300 ml of N-methyl-2-pyrrolidone, a polyimide having a molar ratio of the repeating units of [(1a)+(1b)]: [(2a)+(2b)]=75:25 wherein (1a):(1b)=0:100 and (2a):(2b)=0:100 was obtained in an amount of 80.0 g (yield: 97%) by the same manner as in Example 1.

The IR spectrum measurement of the resultant polyimide showed typical absorption bands of imide at 1715 $cm^{-1}$ and 1786 $cm^{-1}$. The results of measuring the molecular weight, glass transition point and temperature of initiating thermal decomposition of the polyimide are shown in Table 1.

When the solubility of this polyimide was confirmed by the same manner as in Example 1, the polyimide was soluble in the same solvents as described in Example 1.

A nearly colorless and transparent self-supporting tough film was formed by the same manner as in Example 1. When the film was bent 180 degree in order to carry out a flexibility test, the film showed good flexibility without cracking.

Example 32

Using 26.14 g (75 mmol) of 9,9-bis(4-aminophenoxy)fluorene, 6.21 g (25 mmol) of 1,3-bis(3-aminopropyl)-1,1,3,3-tetramethyldisiloxane, 41.03 g (100 mmol) of ethylene glycol bistrimellitate dianhydride and 300 ml of N-methyl-2-pyrrolidone, a polyimide having a molar ratio of the repeating units of [(1a)+(1b)]: [(2a)+(2b)]=75:25 wherein (1a):(1b)=0:100 and (2a):(2b)=0:100 was obtained in an amount of 66.0 g (yield: 95%) by the same manner as in Example 1.

The IR spectrum measurement of the resultant polyimide showed typical absorption bands of imide at 1720 $cm^{-1}$ and 1780 $cm^{-1}$. The results of measuring the molecular weight, glass transition point and temperature of initiating thermal decomposition of the polyimide are shown in Table 1.

When the solubility of this polyimide was confirmed by the same manner as in Example 1, the polyimide was soluble in the same solvents as described in Example 1.

A nearly colorless and transparent self-supporting tough film was formed by the same manner as in Example 1. When the film was bent 180 degree in order to carry out a flexibility test, the film showed good flexibility without cracking.

Example 33

Using 20.53 g (50 mmol) of 2,2-bis[4-(4-aminophenoxy)phenyl]propane, 12.43 g (50 mmol) of 1,3-bis(3-aminopropyl)-1,1,3,3-tetramethyldisiloxane, 35.83 g (100 mmol) of 3,3',4,4'-diphenylsulfonetetracarboxylic dianhydride and 300 ml of N-methyl-2-pyrrolidone, a polyimide having a molar ratio of the repeating units of [(1a)+(1b)]:[(2a)+(2b)]=50:50 wherein (1a):(1b)=100:0 and (2a):(2b)=100:0 was obtained in an amount of 61.0 g (yield: 93%) by the same manner as in Example 1.

The IR spectrum measurement of the resultant polyimide showed typical absorption bands of imide at 1715 $cm^{-1}$ and 1786 $cm^{-1}$. The results of measuring the molecular weight, glass transition point and temperature of initiating thermal decomposition of the polyimide are shown in Table 1.

When the solubility of this polyimide was confirmed by the same manner as in Example 1, the polyimide was soluble in the same solvents as described in Example 1.

A nearly colorless and transparent self-supporting tough film was formed by the same manner as in Example 1. When the film was bent 180 degree in order to carry out a flexibility test, the film showed good flexibility without cracking.

Example 34

Using 30.79 g (75 mmol) of 2,2-bis[4-(4-aminophenoxy)phenyl]propane, 6.21 g (25 mmol) of 1,3-bis(3-aminopropyl)-1,1,3,3-tetramethyldisiloxane, 35.83 g (100 mmol) of 3,3',4,4'-diphenylsulfonetetracarboxylic dianhydride and 300 ml of N-methyl-2-pyrrolidone, a polyimide having a molar ratio of the repeating units of [(1a)+(1b)]:[(2a)+(2b)]=75:25 wherein (1a):(1b)=100:0 and (2a):(2b)=100:0 was obtained in an amount of 65.0 g (yield: 94%) by the same manner as in Example 1.

The IR spectrum measurement of the resultant polyimide showed typical absorption bands of imide at 1720 $cm^{-1}$ and 1783 $cm^{-1}$. The results of measuring the molecular weight, glass transition point and temperature of initiating thermal decomposition of the polyimide are shown in Table 1.

When the solubility of this polyimide was confirmed by the same manner as in Example 1, the polyimide was soluble in the same solvents as described in Example 1.

A nearly colorless and transparent self-supporting tough film was formed by the same manner as in Example 1. When the film was bent 180 degree in order to carry out a flexibility test, the film showed good flexibility without cracking.

Example 35

Using 32.84 g (80 mmol) of 2,2-bis[4-(4-aminophenoxy) phenyl]propane, 4.97 g (20 mmol) of 1,3-bis(3-aminopropyl)-1,1,3,3-tetramethyldisiloxane, 35.83 g (100 mmol) of 3,3',4,4'-diphenylsulfonetetracarboxylic dianhydride and 300 ml of N-methyl-2-pyrrolidone, a polyimide having a molar ratio of the repeating units of [(1a)+(1b)]:[(2a)+(2b)]=80:20 wherein (1a):(1b)=100:0 and (2a):(2b)=100:0 was obtained in an amount of 68.0 g (yield: 97%) by the same manner as in Example 1.

The IR spectrum measurement of the resultant polyimide showed typical absorption bands of imide at 1720 $cm^{-1}$ and 1783 $cm^{-1}$. The results of measuring the molecular weight, glass transition point and temperature of initiating thermal decomposition of the polyimide are shown in Table 1.

When the solubility of this polyimide was confirmed by the same manner as in Example 1, the polyimide was soluble in the same solvents as described in Example 1.

A nearly colorless and transparent self-supporting tough film was formed by the same manner as in Example 1. When the film was bent 180 degree in order to carry out a flexibility test, the film showed good flexibility without cracking.

Example 36

Using 36.95 g (90 mmol) of 2,2-bis[4-(4-aminophenoxy) phenyl]propane, 2.49 g (10 mmol) of 1,3-bis(3-aminopropyl)-1,1,3,3-tetramethyldisiloxane, 35.83 g (100 mmol) of 3,3',4,4'-diphenylsulfonetetracarboxylic dianhydride and 300 ml of N-methyl-2-pyrrolidone, a polyimide having a molar ratio of the repeating units of [(1a)+(1b)]:[(2a)+(2b)]=90:10 wherein (1a):(1b)=100:0 and (2a):(2b)=100:0 was obtained in an amount of 69.0 g (yield: 97%) by the same manner as in Example 1.

The IR spectrum measurement of the resultant polyimide showed typical absorption bands of imide at 1720 $cm^{-1}$ and 1783 $cm^{-1}$. The results of measuring the molecular weight, glass transition point and temperature of initiating thermal decomposition of the polyimide are shown in Table 1.

When the solubility of this polyimide was confirmed by the same manner as in Example 1, the polyimide was soluble in the same solvents as described in Example 1.

A nearly colorless and transparent self-supporting tough film was formed by the same manner as in Example 1. When the film was bent 180 degree in order to carry out a flexibility test, the film showed good flexibility without cracking.

Example 37

Using 30.79 g (75 mmol) of 2,2-bis[4-(4-aminophenoxy) phenyl]propane, 6.21 g (25 mmol) of 1,3-bis(3-aminopropyl)-1,1,3,3-tetramethyldisiloxane, 17.91 g (50 mmol) of 3,3',4,4'-diphenylsulfonetetracarboxylic dianhydride, 20.53 g (50 mmol) of ethylene glycol bistrimellitate dianhydride and 300 ml of N-methyl-2-pyrrolidone, a polyimide having a molar ratio of the repeating units of [(1a)+(1b)]:[(2a)+(2b)]=75:25 wherein (1a):(1b)=50:50 and (2a):(2b)=50:50 was obtained in an amount of 68.5 g (yield: 95%) by the same manner as in Example 1.

The IR spectrum measurement of the resultant polyimide showed typical absorption bands of imide at 1715 $cm^{-1}$ and 1786 $cm^{-1}$. The results of measuring the molecular weight, glass transition point and temperature of initiating thermal decomposition of the polyimide are shown in Table 1.

When the solubility of this polyimide was confirmed by the same manner as in Example 1, the polyimide was soluble in the same solvents as described in Example 1.

A nearly colorless and transparent self-supporting tough film was formed by the same manner as in Example 1. When the film was bent 180 degree in order to carry out a flexibility test, the film showed good flexibility without cracking.

Example 38

Using 30.79 g (75 mmol) of 2,2-bis[4-(4-aminophenoxy) phenyl]propane, 6.21 g (25 mmol) of 1,3-bis(3-aminopropyl)-1,1,3,3-tetramethyldisiloxane, 8.96 g (25 mmol) of 3,3',4,4'-diphenylsulfonetetracarboxylic dianhydride, 30.77 g (75 mmol) of ethylene glycol bistrimellitate dianhydride and 300 ml of N-methyl-2-pyrrolidone, a polyimide having a molar ratio of the repeating units of [(1a)+(1b)]:[(2a)+(2b)]=75:25 wherein (1a):(1b)=25:75 and (2a):(2b)=25:75 was obtained in an amount of 69.5 g (yield: 95%) by the same manner as in Example 1.

The IR spectrum measurement of the resultant polyimide showed typical absorption bands of imide at 1715 $cm^{-1}$ and 1786 $cm^{-1}$. The results of measuring the molecular weight, glass transition point and temperature of initiating thermal decomposition of the polyimide are shown in Table 1.

When the solubility of this polyimide was confirmed by the same manner as in Example 1, the polyimide was soluble in the same solvents as described in Example 1.

A nearly colorless and transparent self-supporting tough film was formed by the same manner as in Example 1. When the film was bent 180 degree in order to carry out a flexibility test, the film showed good flexibility without cracking.

Example 39

Using 30.79 g (75 mmol) of 2,2-bis[4-(4-aminophenoxy) phenyl]propane, 6.21 g (25 mmol) of 1,3-bis(3-aminopropyl)-1,1,3,3-tetramethyldisiloxane, 26.87 g (75 mmol) of 3,3',4,4'-diphenylsulfonetetracarboxylic dianhydride, 10.26 g (25 mmol) of ethylene glycol bistrimellitate dianhydride and 300 ml of N-methyl-2-pyrrolidone, a polyimide having a molar ratio of the repeating units of [(1a)+(1b)]:[(2a)+(2b)]=75:25 wherein (1a):(1b)=75:25 and (2a):(2b)=75:25 was obtained in an amount of 66.0 g (yield: 94%) by the same manner as in Example 1.

The IR spectrum measurement of the resultant polyimide showed typical absorption bands of imide at 1715 $cm^{-1}$ and 1786 $cm^{-1}$. The results of measuring the molecular weight, glass transition point and temperature of initiating thermal decomposition of the polyimide are shown in Table 1.

When the solubility of this polyimide was confirmed by the same manner as in Example 1, the polyimide was soluble in the same solvents as described in Example 1.

A nearly colorless and transparent self-supporting tough film was formed by the same manner as in Example 1. When the film was bent 180 degree in order to carry out a flexibility test, the film showed good flexibility without cracking.

Example 40

Using 30.79 g (75 mmol) of 2,2-bis[4-(4-aminophenoxy) phenyl]propane, 9.42 g (25 mmol) of 1,3-bis[(aminophenoxy)methyl]-1,1,3,3-tetramethyldisiloxane, 35.83 g (100 mmol) of 3,3',4,4'-diphenylsulfone-tetracarboxylic dianhydride and 300 ml of N-methyl-2-pyrrolidone, a polyimide having a molar ratio of the repeating units of [(1a)+(1b)]:[(2a)+(2b)]=75:25 wherein (1a):(1b)=100:0 and (2a):(2b)=100:0 was obtained in an amount of 69.0 g (yield: 95%) by the same manner as in Example 1.

The IR spectrum measurement of the resultant polyimide showed typical absorption bands of imide at 1720 cm$^{-1}$ and 1783 cm$^{-1}$. The results of measuring the molecular weight, glass transition point and temperature of initiating thermal decomposition of the polyimide are shown in Table 1.

When the solubility of this polyimide was confirmed by the same manner as in Example 1, the polyimide was soluble in the same solvents as described in Example 1.

A nearly colorless and transparent self-supporting tough film was formed by the same manner as in Example 1. When the film was bent 180 degree in order to carry out a flexibility test, the film showed good flexibility without cracking.

Example 41

Using 30.79 g (75 mmol) of 2,2-bis[4-(4-aminophenoxy)phenyl]propane, 10.72 g (25 mmol) of aminopropyl terminated dimethylsiloxane tetramer represented by the following formula (5) wherein Y=NH$_2$, R=propylene, n=3),

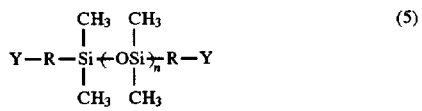

35.83 g (100 mmol) of 3,3',4, 4'-diphenylsulfone-tetracarboxylic dianhydride and 300 ml of N-methyl-2-pyrrolidone, a polyimide having a molar ratio of the repeating units of [(1a)+(1b)]:[(2a)+(2b)]=75:25 wherein (1a):(1b)=100:0 and (2a):(2b)=100:0 was obtained in an amount of 67.0 g (yield: 91%) by the same manner as in Example 1.

The IR spectrum measurement of the resultant polyimide showed typical absorption bands of imide at 1712 cm$^{-1}$ and 1783 cm$^{-1}$. The results of measuring the molecular weight, glass transition point and temperature of initiating thermal decomposition of the polyimide are shown in Table 1.

When the solubility of this polyimide was confirmed by the same manner as in Example 1, the polyimide was soluble in the same solvents as described in Example 1.

A nearly colorless and transparent self-supporting tough film was formed by the same manner as in Example 1. When the film was bent 180 degree in order to carry out a flexibility test, the film showed good flexibility without cracking.

TABLE 1

| | Molecular weight | Glass transition point (°C.) | Temperature of initiating thermal decomposition (°C.) |
| --- | --- | --- | --- |
| Ex. 1 | 39,000 | 230 | 452 |
| Ex. 2 | 14,000 | 217 | 456 |
| Ex. 3 | 37,000 | 180 | 450 |
| Ex. 4 | 13,000 | 220 | 451 |
| Ex. 5 | 48,000 | 190 | 450 |
| Ex. 6 | 68,000 | 190 | 450 |
| Ex. 7 | 40,000 | 190 | 455 |
| Ex. 8 | 39,000 | 230 | 450 |
| Ex. 9 | 25,000 | 192 | 450 |
| Ex. 10 | 38,000 | 160 | 450 |
| Ex. 11 | 53,000 | 232 | 450 |
| Ex. 12 | 25,000 | 230 | 453 |

TABLE 1-continued

| | Molecular weight | Glass transition point (°C.) | Temperature of initiating thermal decomposition (°C.) |
| --- | --- | --- | --- |
| Ex. 13 | 12,000 | 170 | 450 |
| Ex. 14 | 26,000 | 211 | 458 |
| Ex. 15 | 23,000 | 201 | 451 |
| Ex. 16 | 36,000 | 241 | 452 |
| Ex. 17 | 29,000 | 190 | 452 |
| Ex. 18 | 12,000 | 177 | 456 |
| Ex. 19 | 27,000 | 140 | 455 |
| Ex. 20 | 13,000 | 180 | 451 |
| Ex. 21 | 38,000 | 150 | 453 |
| Ex. 22 | 58,000 | 153 | 453 |
| Ex. 23 | 38,000 | 149 | 455 |
| Ex. 24 | 29,000 | 190 | 453 |
| Ex. 25 | 15,000 | 152 | 454 |
| Ex. 26 | 28,000 | 130 | 453 |
| Ex. 27 | 43,000 | 182 | 452 |
| Ex. 28 | 22,000 | 190 | 453 |
| Ex. 29 | 11,000 | 134 | 451 |
| Ex. 30 | 22,000 | 171 | 448 |
| Ex. 31 | 21,000 | 161 | 454 |
| Ex. 32 | 26,000 | 201 | 455 |
| Ex. 33 | 23,000 | 180 | 451 |
| Ex. 34 | 45,000 | 226 | 465 |
| Ex. 35 | 46,000 | 236 | 464 |
| Ex. 36 | 48,000 | 248 | 460 |
| Ex. 37 | 34,000 | 199 | 458 |
| Ex. 38 | 31,000 | 183 | 455 |
| Ex. 39 | 43,000 | 220 | 465 |
| Ex. 40 | 44,000 | 230 | 455 |
| Ex. 41 | 43,000 | 180 | 440 |

The measurement of the molecular weight was carried out using tetrahydrofuran as an eluent and Shodex 80M×2 as columns. The value of the molecular weight is a number average molecular weight which is calculated as polystyrene. The glass transition point was determined by a differential thermal analysis (in a nitrogen atmosphere, heated at 10° C./min.) and the temperature of initiating thermal decomposition was determined by a thermogravimetry (in a nitrogen atmosphere, heated at 10° C./min.).

We claim:

1. A polyimide comprising at least one of repeating units represented by the following formulas (1a) and (1b) and at least one of repeating units represented by the following formulas (2a) and (2b) and has a number average molecular weight of from 4,000 to 200,000:

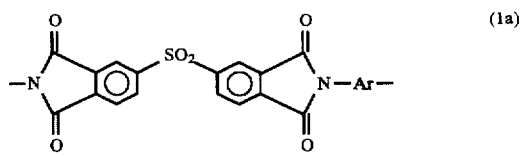

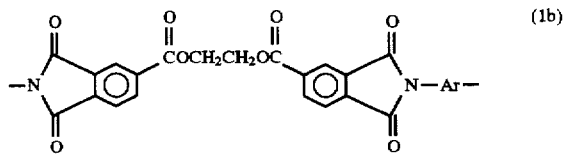

wherein Ar is a divalent aromatic group selected from the group consisting of following formulas:

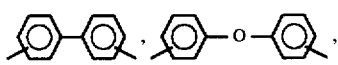

-continued

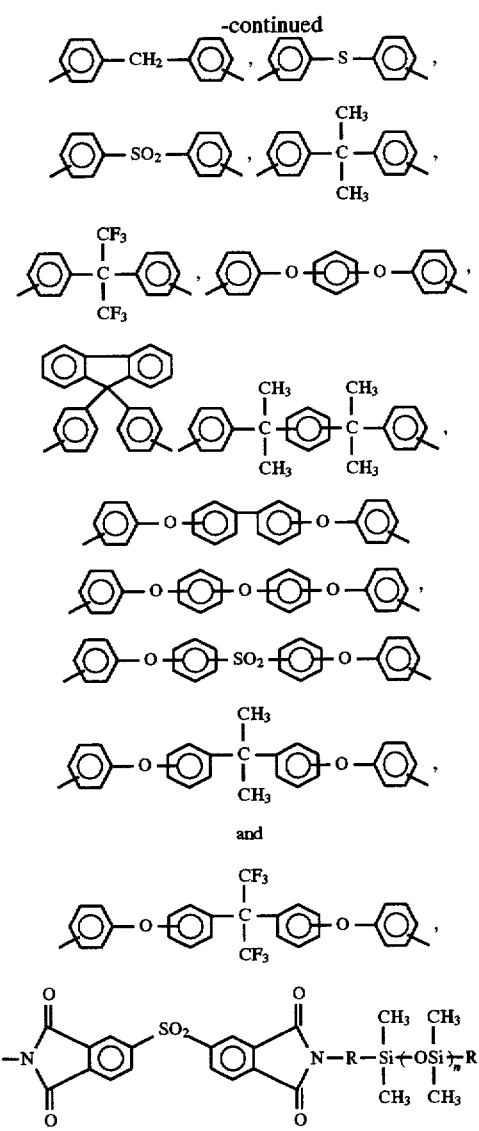

wherein R represents an alkylene group having 1–10 carbon atoms or a group: —CH$_2$OC$_6$H$_4$—, and n is an integer of 1–20.

2. A polyimide as claimed in claim 1, wherein the proportion of the repeating units represented by the above formulas (1a) and (1b) is from 95 to 40 mol % and the proportion of the repeating unit represented by the above formulas (2a) and (2b) is from 5 to 60 mol %.

3. A polyimide as claimed in claim 1 which comprises the repeating units represented by the formulas (1a) and (1b) and the repeating unit represented by the above formula (2a).

4. A polyimide as claimed in claim 1 which comprises the repeating units represented by the formulas (1a) and (1b) and the repeating unit represented by the above formula (2b).

5. A polyimide as claimed in claim 1 which comprises the repeating units represented by the formulas (1a) and (1b) and the repeating units represented by the above formula (2a) and (2b).

6. A process for producing a polyimide comprising at least one of repeating units represented by the following formulas (1a) and (1b) and at least one of repeating units represented by the following formulas (2a) and (2b) and has a number average molecular weight of from 4,000 to 200,000:

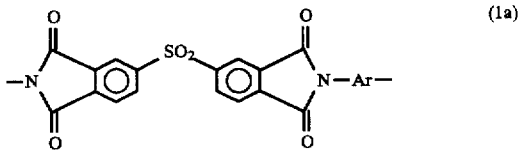

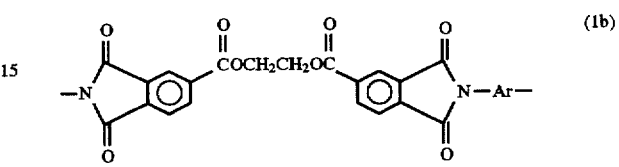

wherein Ar is a divalent aromatic group selected from the group consisting of following formulas:

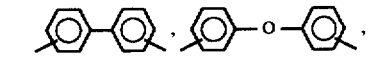

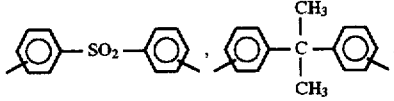

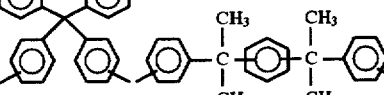

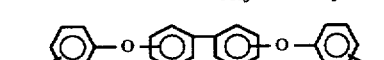

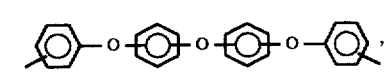

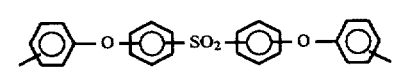

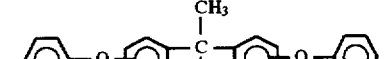

and

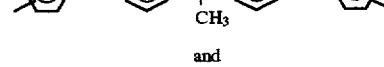

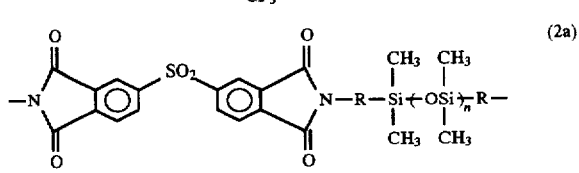

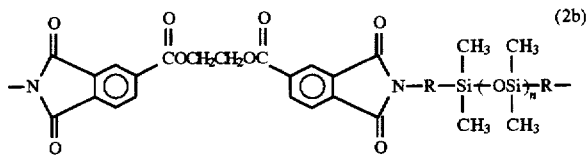

wherein R represents an alkylene group having 1–10 carbon atoms or a group: —CH$_2$OC$_6$H$_4$—, and n is an integer of 1–20.

which comprises reacting at least one compound selected from tetracarboxylic dianhydrides represented by the following formulas (3a) and (3b) with a compound represented by the following formula (4) and a siloxane compound represented by the following formula (5):

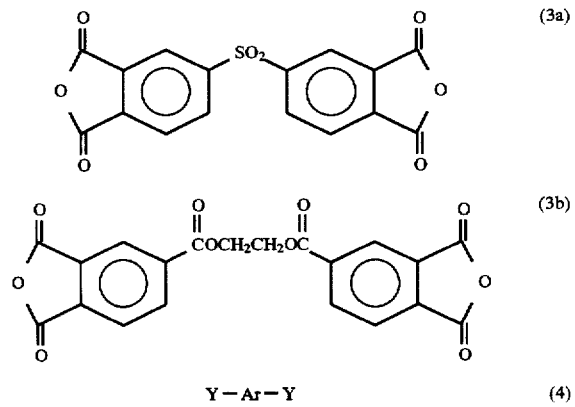

Y—Ar—Y    (4)

wherein Ar has the same meaning as described above, and Y represents an amino group or an isocyanate group,

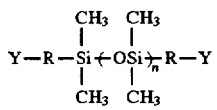

wherein R, Y and n have each the same meaning as described above.

7. A process for producing a polyimide as claimed in claim 6, wherein the proportion of the repeating units represented by the above formulas (1a) and (1b) is from 95 to 40 mol % and the proportion of the repeating unit represented by the above formulas (2a) and (2b) is from 5 to 60 mol %.

8. A process for producing a polyimide as claimed in claim 6 which comprises reacting a tetracarboxylic dianhydride represented by the above formula (3a) with a compound represented by the above formula (4) and a siloxane compound represented by the above formula (5).

9. A process for producing a polyimide as claimed in claim 6 which comprises reacting a tetracarboxylic dianhydride represented by the above formula (3b) with a compound represented by the above formula (4) and a siloxane compound represented by the above formula (5).

10. A process for producing a polyimide as claimed in claim 6 which comprises reacting tetracarboxylic dianhydrides represented by the above formulas (3a) and (3b) with a compound represented by the above formula (4) and a siloxane compound represented by the above formula (5).

* * * * *